United States Patent [19]

Card et al.

[11] Patent Number: 4,480,811

[45] Date of Patent: Nov. 6, 1984

[54] FAIL-SAFE ACTUATOR DEVICE

[75] Inventors: Lorin P. Card, Sepulveda; Otto W. Borsting, Long Beach, both of Calif.

[73] Assignee: VSI Corporation, Pasadena, Calif.

[21] Appl. No.: 525,969

[22] Filed: Aug. 24, 1983

Related U.S. Application Data

[63] Continuation-in-part of Ser. No. 281,087, Jul. 7, 1981, Pat. No. 4,412,670.

[51] Int. Cl.³ .............................................. F16K 31/00

[52] U.S. Cl. .......................................... 251/14; 92/94; 92/98 D; 92/99; 92/137

[58] Field of Search .................... 92/99, 100, 94, 98 D, 92/137; 251/14, 27; 60/403, 418

[56] References Cited

U.S. PATENT DOCUMENTS

| | | | |
|---|---|---|---|
| 862,867 | 8/1907 | Eggleston | 417/390 |
| 3,144,812 | 8/1964 | Roger et al. | 92/137 |
| 3,293,992 | 12/1966 | Baumann | 92/94 |
| 3,386,345 | 6/1968 | Taplin | 92/99 |
| 3,801,062 | 4/1974 | Arn et al. | 251/14 |
| 4,003,547 | 1/1977 | Snyder et al. | 92/137 |
| 4,397,219 | 8/1983 | Belart | 92/98 D |

FOREIGN PATENT DOCUMENTS

| | | | |
|---|---|---|---|
| 2751430 | 5/1979 | Fed. Rep. of Germany | 92/98 D |

*Primary Examiner*—A. Michael Chambers
*Attorney, Agent, or Firm*—Arthur B. Colvin

[57] ABSTRACT

The present invention relates to a fail-safe actuator of the type in which a piston riding in a cylinder is urged toward a port end of the cylinder by an energy storage spring. The piston is prevented from moving toward the port end so long as liquid remains entraped between the piston and port end, movement of the piston toward the port end resulting in shifting of a cable and consequent rotation of a quadrant about which the cable is arrayed to rotate a shaft. A rolling seal diaphragm is interposed between the piston and cylinder whereby leakage is prevented over protracted use periods, and the piston is isolated from liquid between the port and piston. Optionally, an annulus disposed between the piston and cylinder bears against the roll seal portion of the diaphragm preventing extrusion or permanent distortion of the diaphragm under high pressure conditions.

4 Claims, 5 Drawing Figures

FIG.4
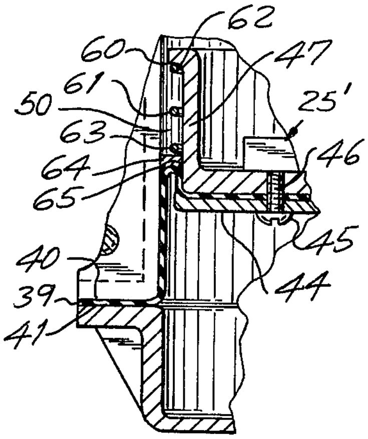
FIG.4a
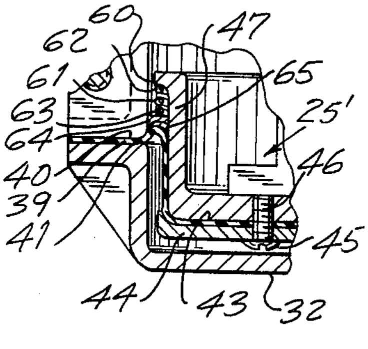
FIG.2
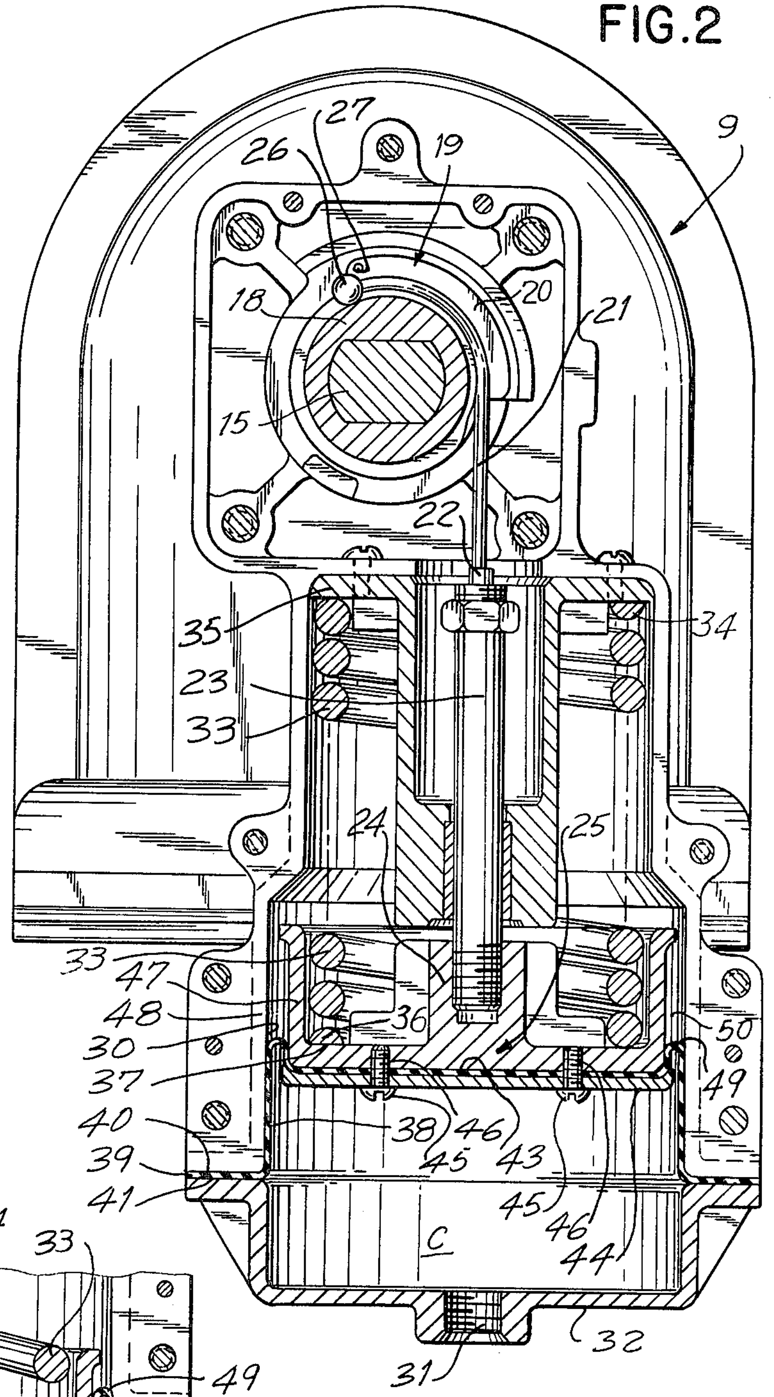
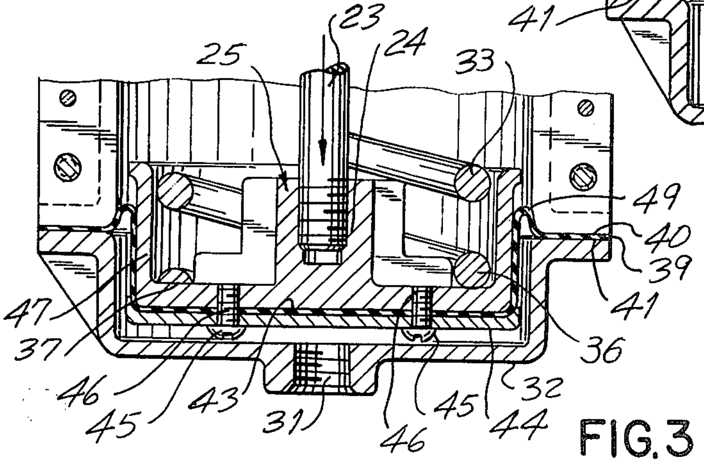
FIG.3

FAIL-SAFE ACTUATOR DEVICE

PRIOR APPLICATIONS

The present application is a continuation-in-part of application Ser. No. 281,087 filed July 7, 1981 now U.S. Pat. No. 4,412,670 issued Nov. 1, 1983 and entitled "FAIL-SAFE ACTUATOR AND HYDRAULIC SYSTEM INCORPORATING THE SAME".

BACKGROUND OF THE INVENTION

The present invention is in the field of fail-safe actuator devices and pertains more particularly to an apparatus for use with a hydraulic control system, which functions under failure conditions to effect operations such as shutting off valves. More particularly, the invention relates to a fail-safe device wherein energy is stored under normal operating conditions, the stored energy being effective under failure conditions to effect an operation such as a safety closure operation.

THE PRIOR ART

In U.S. Pat. No. 4,295,630 there is disclosed a fail-safe actuator and various systems incorporating same which function in a manner similar to the functioning of the instant invention. More particularly, the device of the aforesaid U.S. patent, the substance of which is incorporated herein by reference, includes a housing incorporating a cylinder within which is mounted for reciprocation a piston member. Spring means are provided to drive the piston toward a first end of the cylinder, said first end of the cylinder including a port through which hydraulic fluid may enter and be expelled. The piston includes a cable connection which wraps about an arcuate quadrant operatively connected to a shaft journaled in the housing for rotary movement about a pivot axis perpendicular to the direction of reciprocation of the piston head.

Energy is stored in the device by admitting hydraulic fluid through the port to urge the piston away from the port and cock the spring. So long as the port is closed the piston will remain in a position remote from the port and will retain the spring under compression.

The shaft carrying the quadrant may be operated without interference from the piston and spring arrangement, since the cable connecting the piston head to the quadrant is slack when the shaft is rotated in a first direction and becomes tightened only when the shaft is rotated to its opposite limiting position.

When a failure condition is sensed, the port is connected to a reservoir permitting the hydraulic fluid entrapped between the piston and port to be evacuated from the cylinder. Under such circumstance the energy stored in the spring will drive the piston head toward the port causing the cable to rotate the yoke or quadrant and inducing a rotary movement in the quadrant shaft whereby a safety valve is closed or some other failure responsive operation is carried out.

As will be appreciated from the above brief description, the fail-safe apparatus of the above noted patent will normally be in the cocked position and will move from such position only in the event a failure condition is sensed, i.e. such as a power loss. It will thus be apparent that to be effective in failure situations, even minute leakage conditions which would be tolerable in apparatus frequently cycled are unacceptable.

It has been determined that the use in a fail-safe environment of conventional O-ring piston head seals, such as have been incorporated in the fail-safe actuator of the above referenced U.S. patent, cannot resist to a completely satisfactory degree leakage around the seal. Obviously, if the piston head should move over such protracted period to the port end of the cylinder, the spring will become relaxed and the fail-safe actuator will be ineffective in the event of a failure condition sensed. Additionally, movement of the piston head to the port end of the cylinder will interfere with the normal operation of the apparatus connected to the quadrant.

A further drawback inherent in the fail-safe actuator of the above referenced patent resides in the fact that the piston head is subjected to contact with fluid within the cylinder over protracted periods of time. If the piston head is fabricated of a material which chemically interacts with the hydraulic fluid, or if in lieu of a conventional hydraulic oil the fail-safe unit is utilized with water or with a corrosive liquid, the liquid may attack the metallic materials of the cylinder and/or the piston head with resultant compromise of the fail-safe apparatus through corrosion or the accumulation of foreign materials in the cylinder chamber which may block the desired rapid egress of liquid from the cylinder in the event of a failure situation.

SUMMARY OF THE INVENTION

The present invention is related to an improved fail-safe actuator which is characterized in that a leak proof assembly is effected between the piston head and the port whereby there is no liklihood of loss of fluid and premature dissipation of the energy stored in the actuating spring. The invention may be further summarized as directed to a fail-safe actuator of the type described wherein the piston head is entirely isolated from the liquids in the chamber defined between the head and the port end of the cylinder, whereby water or other fluids which may tend to attack the piston head are positively isolated from contact therewith.

In the illustrative embodiment shown, the fail-safe actuator has a control shaft axially coupled to the shaft of a hydraulic rotary actuator assembly illustratively in the form shown and described in U.S. Pat. No. 3,839,945 and the shaft of said rotary actuator is axially coupled to the shaft of a valve, illustratively of the rotary type.

It is accordingly an object of the present invention to provide a fail-safe actuator apparatus which is leak proof over protracted periods and which functions to isolate the piston head entirly from any liquids encompassed in the chamber defined between the piston head and the port end of the cylinder. Still, more particularly, the present invention is directed to a fail-safe actuator device having a spring urged piston head and having a rolling diaphragm type separator member interposed between the piston head and port end of the cylinder, which separator element comprises an integral elastomeric membrane or sheet. The membrane or sheet provides a rolling barrier between the piston head and remainder of the cylinder thereby eliminating the leakage path between piston head and cylinder wall which is defined by conventional O-rings or like seals. The diaphragm likewise provides a barrier between the piston head and fluids entraped between the head and port end of the cylinder whereby the head is protected from conditions which might tend to rust, corrode or otherwise damage the piston.

A further object of the invention is the provision of a fail-safe device of the type described wherein the diaphragm is rendered resistant to extrusion enabling the use of higher pressures than normally possible with diaphragms of this type.

In order to attain these objects and such other objects as appear herein or which may be hereinafter pointed out reference is made to the accompanying drawings wherein:

FIG. 2 is a vertical section taken on the line 2—2 FIG. 1.

FIG. 3 is a fragmentary vertical section similar to portions of the section of FIG. 2 showing the position of the parts after a failure condition has occurred.

Figure 1:
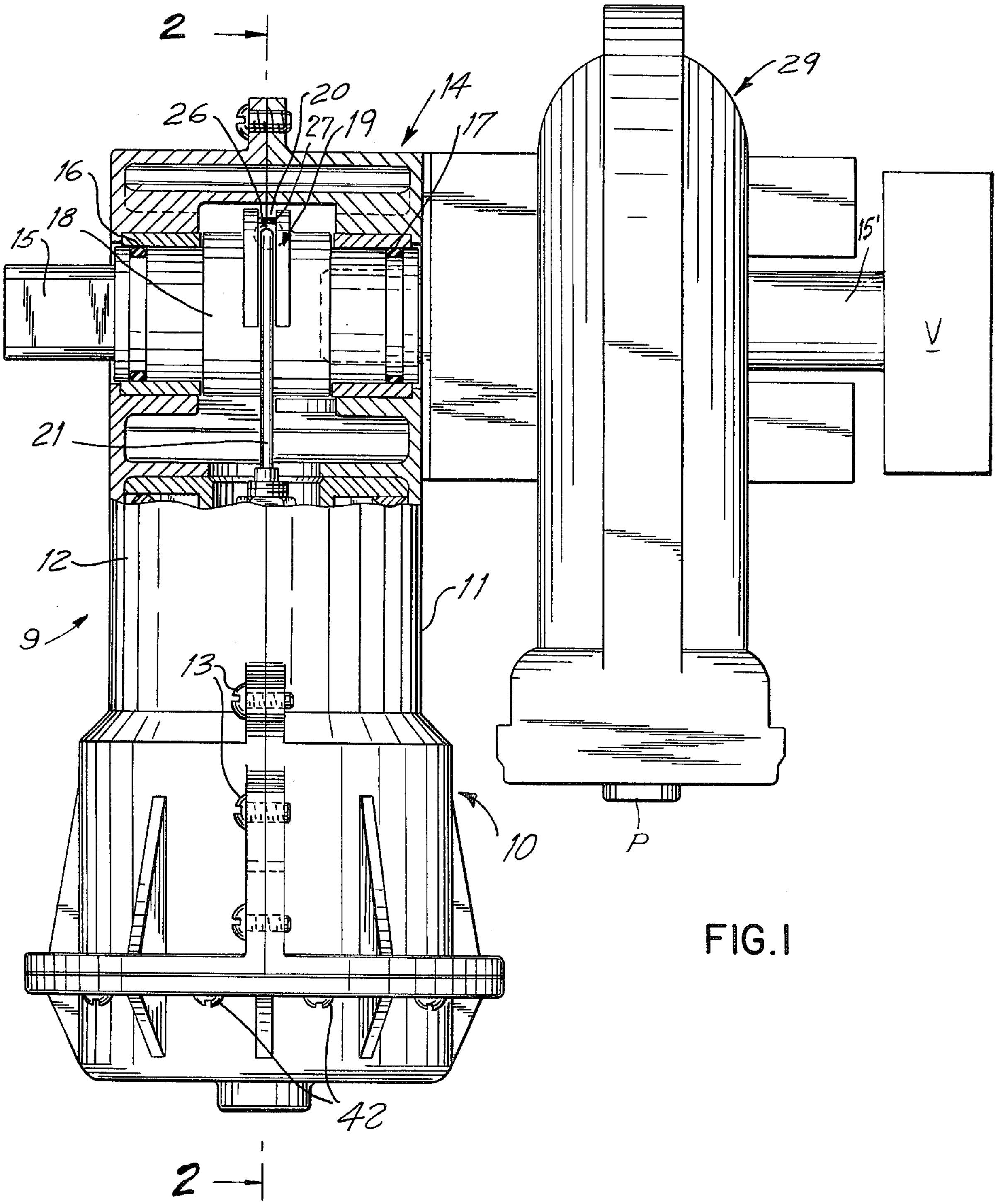
FIG. 1 is an end elevational view of a device in accordance with the invention with parts shown in section.

FIGS. 4 and 4*a* are fragmentary sectional views of an embodiment of the invention respectively in the normal and post failure positions thereof.

Referring now to the drawings there is shown in FIG. 1 a fail-safe actuator device 9 which includes a housing 10 which is generally cylindrical in transverse section and which may be formed of two half shell portions 11,12 suitably interconnected as by cross bolts 13.

The casing 10 adjacent its upper end 14 is provided with a transversely directed shaft member 15 journaled in spaced bearings 16,17 formed in the housing. Secured to the shaft 15 is a hub 18 to which is manned a yoke or quadrant member 19 having an outwardly open peripherial track 20 in which is positioned a flexible actuator cable 21, one end 22 of which is adjustably connected to piston rod 23 threadedly mounted to hub 24 of piston head assembly 25.

As is best seen from FIG. 2 the other end of cable 21 which mounts a stop ball 26 is secured to the yoke 19 by a cross pin 27 extending through the quadrant 19.

As will be apparent from a consideration of FIG. 2 a downward movement of the cable 21 as by actuation of the fail-safe device will induce a concommitant clockwise rotary movement of the shaft 15 which movement will be utilized, in a manner more fully described hereinafter, and in substance identical to the action of the apparatus of U.S. Pat. No. 4,295,630, to activate a valve V or the like.

It will be understood that the device as shown in FIG. 2 is depicted in its normal operating condition, i.e. a non failure condition. In such condition it will be understood that as is the case with the apparatus of U.S. Pat. No. 4,295,630, rotation of the shaft 15 in a clockwise direction, and return of the shaft 15 to the position shown in FIG. 2 may be accomplished without interference from the cable, since the same is laid in the outwardly open track 20 of the quadrant 19.

More particularly as is described in U.S. Pat. No. 4,295,630, the valve V is normally operated by a hydraulic rotary actuator 29 of the type described in U.S. Pat. No. 3,839,945. This actuator 29 has a pair of control parts P to which fluid under pressure may alternatively be applied to cause rotation of shaft 15' in a clockwise or counterclockwise direction. It is when there is a power failure which cuts off the supply of fluid under pressure to the rotary actuator 29, that the fail-safe device 9 comes into action to cause operation of valve V.

Referring now, more particularly, to FIGS. 2 and 3 the housing 10 defines a cylinder area 30 within which the piston head assembly 25 may reciprocate axially of the cylinder. A liquid port 31 is formed in the end wall 32 of the housing. The port 31 is connected to a hydraulic system forming no part of the instant invention and fully disclosed in the above referenced U.S. patent, the port 31 providing a means whereby hydraulic fluid or water or like liquid under pressure may be introduced into the chamber C defined between the port and piston head at the same time as fluid under pressure is initially applied to one of the control parts P of the rotary actuator 29.

The piston head assembly 25 is normally urged downwardly toward the position shown in FIG. 3 by a powerful coil spring 33 which surrounds the piston rod 23, the upper end 34 of the spring 33 being biased against a stop wall 35 internally of the housing. The lower end 36 of the spring 33 bears against downwardly facing wall portion 37 of the piston head assembly 25.

The piston head assembly 25 is isolated from the chamber C, i.e. the chamber C is sealed at its upper end, by a rolling diaphragm member 38 which will next be described. The diaphragm 38 which is preferably formed of a corrosion resistant elastomeric material is clamped at its peripherial edge 39 between downwardly facing ledge portion 40 of the housing and upwardly facing ledge portion 41 of the end cap member 32. The cap is tightly clamped against the housing pinching the diaphragm periphery therebetween by a plurality of end screws 42 (see FIG. 1).

The rolling diaphragm 38 is arranged against the underface 43 of the piston assembly 25 and is held in such position by a locking plate 44 which overlies the central area of the diaphragm 38. The locking plate 44 is held in position by retainer screws 45 which pass through the plate 44 and the diaphragm and are threadedly engaged in complemental apertures 46 formed in the head assembly 25.

As will be apparent from FIGS. 2 and 3 there is defined between the outer peripherial wall 47 of the piston assembly 25 and the inner peripherial wall 48 of the cylinder 30 a clearance space or area 50 which is annular in transverse section. The diaphragm 38 includes a roll portion 49 which projects upwardly into the annular space 50 thus defining a seal surrounding the piston assembly 25.

The piston assembly 25 is shown in its upper and lower limiting positions in FIGS. 2 and 3 respectively. As will be evident from a comparison of such figures, it will be seen that when the piston shifted downwardly to the position shown in FIG. 3 the diaphragm 38 tends to wrap about the outer wall 47 of the piston assembly 25.

Although roll diaphragm assemblies are known per se as for instance in U.S. Pat. Nos. 4,070,946; 3,375,760; 3,386,345; 2,989,991; and perhaps others, the combination in a fail-safe actuator of the type hereinabove described is considered to provide an uniquely useful assembly which is capable of operating over a multiplicity of cycles and still remain leak free since the diaphragm presents only a minor fraction of the frictional resistance to movement which is present where O-rings or similar sealing mechanisms defining a wiping connection with the center cylinder walls are employed. Similarly, by entirely isolating the metallic elements of the piston head against contact with fluid in the chamber C, the apparatus is rendered useful in conjunction with liquids such as water or corrosive or acidic solutions which might otherwise damage the piston assembly.

It is noted that certain fail-safe devices may be subjected to extremely high pressures. In certain cases such pressures may be sufficiently great to induce an extrusion or upward deformation of the roll portion 49 of the diaphragm through the annular gap 50 defined about the piston head assembly, particularly since the spring pressures may be present over protracted periods of inactivity.

In FIGS. 4 and 4*a* there is disclosed an embodiment which is resistant to such extrusion. In the embodiment of FIGS. 4 and 4*a* disclosing the piston position in the retracted and extended positions respectively, the piston head assembly 25' includes an outwardly directed annular retainer shoulder 60. A coil spring member 61 includes an uppermost convolution 62 bearing against the undersurface of the retainer 60. The lowermost convolution 63 of the spring 61 bears against a downwardly directed cap member 64 of rigid metallic material the undersurface of which preferably carries a liner 65 of nylon, teflon or like anti-friction material.

It will be understood that all of the noted parts, namely the spring, the cup, the cap member and the liner are disposed within the annular space 50 between the piston and cylinder. The spring 61 urges the cap member and anti-friction portions downwardly into contact with the roll portion 49 of the diaphragm. In this manner it will be understood that the roll portion 49 is rendered resistant to extrusion upwardly through the annular space 50.

While the upper end 62 of the spring 61 is disclosed as being biased against an overhanging portion 60 forming a part of the piston head assembly 25, it will be readily recognized that the upper end of said spring may be biased against a fixed annular shoulder extending inwardly from the inner wall 48 of the cylinder member. Such an arrangement, may, indeed, be preferable since where the upper end of the spring is fixed, as opposed to movable with the piston, the pressure exerted by the cap member and its anti-friction liner will be greatest when the fluid pressure in chamber C is greatest and, hence, most likely to induce extrusion of the diaphragm.

The operation of the device will be evident from the preceeding description. When the system is functioning in its normal mode, i.e. when one of the parts P of the rotary action 29 is supplied with fluid under pressure to rotate the shaft 15' and move valve V to say open position, at the same time fluid under pressure will be applied to port 31 of the fail-safe device 9 to move the piston 25 upwardly to the position shown in FIG. 2. This will cock the core spring 33. The shaft 15 controlling valve V and hence shaft 15 is free to be rotated in a clockwise position from the position shown in FIG. 2 and to return in an counterclockwise direction to the position shown in FIG. 2 without interference from the fail-safe mechanism, since with the piston 25 in the uppermost position shown in FIG. 2, when the shaft 15 of the fail-safe device 9 is turned in a clockwise direction by rotation of shaft 15' of the rotary actuator to move valve V to closed position, the cable 21 will become slackened. It will be understood that the piston 25 will be retained in the position of FIG. 2 so long as the pressure of the liquid in the chamber C is sufficiently great to overcome the return force of the spring 33.

When a failure condition is sensed, i.e. when the hydraulic fluid pressure to the rotary actuator 29 and to port 31 fails and the rotary actuator cannot function to turn valve V, to closed position for example, the chamber C is automatically vented to the reservoir through port 31 as by the circuitry disclosed in U.S. Pat. No. 4,295,630. Since with valve V in open position for example, the fail-safe device 9 is in the position shown in FIG. 2, i.e. the cable is taut, with the pressure relieved from chamber C, the force of the spring 33 is sufficient to shift the piston head assembly 25 downwardly to the position shown in FIG. 3 causing the piston rod 23 and its associated cable 21 to move downwardly resulting in a clockwise shifting movement of the shaft 15, thus actuating the shaft 15' of the rotary actuator 27 and the valve V to move the latter to closed position. It is thus assured that the shut-off valve V is turned to the desired position when a failure condition, such as a power failure, is sensed.

As will be evident to those skilled in the art numerous variations in details of construction may be made without departing from the spirit of the invention. Accordingly, the same is to be broadly construed within the scope of the appended claims.

Having thus described the invention and illustrated its use, what is claimed as new and is desired to be secured by Letters Patent is:

1. In a fail-safe apparatus of the type which comprises a housing defining a cylindrical bore having a port in one end, a piston member mounted for axial movement in said bore toward and away from said one end, between a charged limiting position whereat said piston is spaced a predetermined distance from said one end and a discharged limiting position whereat said piston lies adjacent to said one end, spring means in said bore and biased between said piston and the other end of said bore and urging said piston toward said one end, a flexible cable member operatively connected at one end to said piston member, a drive shaft mounted in said housing for rotation about an axis normal to the axis of said bore, said shaft including a yoke having an outwardly open arcuate track concentric with the axis of said shaft, the other end of said cable member being secured to said yoke, said cable being arrayed in said track, the improvement which comprises said piston defining with said bore an annular clearance space, a rolling elastomeric diaphragm member mounted in said bore in the area between said one end and said piston, said diaphragm including an outer annular portion adapted to line said bore, an inner annular portion extending into said clearance space and adapted to line the outer periphery of said piston, and a roll portion linking said inner and outer annular portions and disposed within said clearance space, an annulus surrounding said piston and movably mounted in said clearance space, said annulus including a stop face directed toward said one end of said bore, and spring means biased against said annulus and urging said stop face into engagement with said roll portion to prevent extrusion of said roll portion of said diaphragm away from said one end and through said clearance space.

2. Apparatus in accordance with claim 1 wherein portions of said spring means remote from said annulus are biased against portions of said piston.

3. Apparatus in accordance with claim 1 wherein portions of said spring means remote from said annulus are biased against fixed inner wall portions of said cylinder.

4. Apparatus in accordance with claim 1 wherein said stop face comprises an anti-friction polymeric material.

* * * * *